United States Patent Office 2,902,405
Patented Sept. 1, 1959

2,902,405

DIATOMIC IODINE-FORMING COMPOSITION AND METHOD OF MAKING THE SAME

Benjamin Carroll, New York, and Volda Kitter, Long Island City, N.Y., assignors to Heliogen Products, Inc., Long Island City, N.Y., a corporation of Delaware No Drawing. Application February 21, 1956
Serial No. 566,758

5 Claims. (Cl. 167—70)

This invention relates to the preparation of aqueous iodine solutions and more particularly to a novel and improved solid composition adapted to be dissolved in water to produce an aqueous solution of diatomic iodine having useful germicidal properties.

It has been known for many years that iodine and certain of its compounds possess useful germicidal properties and considerable thought has been given to ways in which these properties might be effectively used. In recent years it has been demonstrated that freshly prepared aqueous solutions of diatomic iodine possess properties as a germicide that are superior to those of the germicidal iodine-containing compositions previously used, both for therapeutic purposes and for general sanitizing purposes. Since the germicidal effectiveness of these solutions deteriorates fairly rapidly, it is important that they be prepared shortly before they are used. Accordingly it has become the practice to prepare powders or tablets containing as their active ingredients reagents which when dissolved in water react to form the desired diatomic iodine solutions. Such solid compositions frequently comprise a water-soluble metal iodide e.g. potassium iodide or sodium iodide, and a compound which releases chlorine in the presence of water e.g. a chloramine, together with various subsidiary materials such as effervescing agents, fillers, buffers, etc. These solid compositions may be stored at the point of use and dissolved at the time the germicidal solution is required.

In the commercial utilization of compositions containing a metal iodide and an oxidant such as a chloramine certain difficulties have been encountered due to a tendency of these compositions to deteriorate in storage. Apparently the water of hydration of the oxidant causes a slow reaction to occur whereby iodine is released. Thus if the composition is dissolved in water after an extended storage period the desired concentration of diatomic iodine is not obtained.

To overcome this difficulty it has been the practice to thoroughly dehydrate the oxidant before it is mixed with the other ingredients of the composition, and such dehydration has been found to render the composition stable in storage. However, preliminary dehydration of the oxidant leads to various other difficulties. Thus complete dehydration of the oxidant causes the crystals to break down into an extremely fine powder. Such powders are difficult to handle in the packaging of solid compositions for releasing iodine. Also, if one constituent of a solid composition is a fine powder and the other constituents are relatively coarse, thorough mixing of the ingredients is rendered difficult and there is a tendency for the ingredients to become stratified in the package. Moreover, in the production of tablets from such non-homogeneous mixtures separation of the ingredients occurs in the hopper that feeds the tablet machine.

Other difficulties that arise when the oxidant is thoroughly dehydrated are that the rate of solubility of the composition is significantly reduced and that certain oxidants become inflammable and/or explosive in the anhydrous state. Also dehydration of the oxidant is a time-consuming process and increases the manufacturing cost of the composition.

It is accordingly an object of the present invention to provide a solid composition for releasing iodine in water which avoids the difficulties outlined above, that is to say, which is stable in storage, dissolves readily in water, and readily forms a homogeneous stable mixture.

We have found that for the oxidants that have been proposed for use in such compositions there is a critical range of hydration such that oxidants having a degree of hydration within this range can be mixed with metal iodides to form compositions which are stable in storage for extended periods of time and which are not subject to the difficulties encountered when anhydrous oxidants are used. More particularly, we have found that the difficulties referred to can be avoided by partially dehydrating the oxidant to yield a product having from 0.5 to about 1.5 to 1.75 mols of water of hydration per mol of anhydrous material, and then incorporating it in a solid composition of the type previously used.

The preferred oxidants for use in the compositions of the present invention are N-chlorosulfonamides having one atom of chlorine per molecule. Examples of such oxidants are chloramine-B and chloramine-T. The preferred water-soluble metal iodide is potassium iodide.

The hydration range disclosed and claimed herein appears to be quite critical. Thus as the oxidant is dehydrated a sharp decrease in vapor pressure occurs at 0.5 mol of water per mol of anhydrous material and this drop in vapor pressure is accompanied by various changes in the physical and chemical properties of the product. At hydrations below 0.5 the product tends to cake, thus making it more difficult to mix with the metallic iodide, whereas within the range disclosed herein the product is a free flowing powder. Also the inflammability of the product increases quite sharply at hydrations below 0.5, thereby creating a danger of explosions. Above hydrations of 0.5, on the other hand, the partially dehydrated product is not very combustible. Moreover disintegration of the crystal structure becomes quite marked below 0.5 hydration, thus leading to the packaging difficulties outlined above.

The upper limit of the hydration range is likewise critical, but varies slightly for different oxidants. Thus for chloramine-T the upper limit is close to 1.5 molecules of water per mol of anhydrous product, whereas with chloramine-B the hydration may be as great as 1.75 and still give a stable product when mixed with the metal iodide.

Dehydration of the oxidant may be effected by heating the material either at atmospheric pressure or under vacuum in known manner. The degree of dehydration can be conveniently determined by measuring the relative vapor pressure of the product i.e. the quotient of the vapor pressure of the product and the vapor pressure of water at the same temperature. We have found that as the dehydration of the oxidant approaches the upper end of the critical range given above i.e. 1.5 to 1.75 molecules of water of hydration, there is a sharp decrease in the relative vapor pressure. For example, in the case of chloramine-T, 1.5 molecules of water of hydration corresponds to 9% by weight water of hydration. It has been found that at 10% water content chloramine-T exhibits a relative vapor pressure of about 0.3 at room temperature, whereas at 8% water content its relative vapor pressure is only about 0.1. In general it is desirable that the dehydration be carried to the point where the relative vapor pressure of the oxidant is less than 0.2. While we do not wish to be bound by any particular theory concerning our invention, it seems likely that the sharp decrease in relative vapor pressure referred to above may be responsible for the fact that oxidants having a degree of hydration within the range disclosed herein may be mixed with metal iodides to provide compositions having greatly improved stability.

In order to point out more fully the nature of the present invention the following specific examples are given of solid compositions prepared according to the invention.

Example 1

Chloramine-T (sodium N-chloro-p-toluene sulfonamide) was heated in vacuo at a temperature of 85° C. until its water of hydration had been reduced to 6%, which corresponds to the monohydrate. The partially dehydrated material exhibited a relative vapor pressure of 0.10.

The chloramine-T monohydrate was mixed with potassium iodide, citric acid, sodium bicarbonate and non-reactive fillers in the proportions given below and pressed to form a tablet. The ingredients other than chloramine-T were used in the anhydrous state with surface moisture removed.

|  | Mgs. |
|---|---|
| Chloramine-T | 26.5 |
| Potassium iodide | 32.7 |
| Citric acid | 170.50 |
| Sodium bicarbonate | 250.93 |
| Non-reactive fillers | 167.13 |

The above composition was found to be stable even when stored at 110° F. It dissolved readily in water to form a germicidally effective solution of diatomic iodine.

Example 2

Chloramine-B ($C_6H_5SO_2NClNa$) was heated in vacuo at 90° C. until its water of hydration had been reduced to 9%, which corresponds to 1.25 molecules of water of hydration per molecule of anhydrous chloramine. The relative vapor pressure of the product was less than 0.10. The partially dehydrated chloramine-B was mixed with potassium iodide and sodium dihydrogen phosphate in the proportions given below in parts by weight.

|  | Parts |
|---|---|
| Chloramine-B | 1.77 |
| Potassium iodide | 2.50 |
| Sodium dihydrogen phosphate | 5.00 |

This mixture, like that of Example 1, was stable when maintained at 110° F. for an extended period of time and was readily soluble in water to give diatomic iodine solution.

It is of course to be understood that the foregoing examples are illustrative only and that numerous changes change can be made in the ingredients, proportions and conditions set forth without departing from the spirit of the invention as set forth in the appended claims.

We claim:

1. A stable solid composition adapted to be dissolved in water to form a diatomic iodine solution, said composition comprising a water-soluble alkali metal iodide and chloramine-T having from 0.5 to about 1.5 molecules of water of hydration.

2. A stable solid composition adapted to be dissolved in water to form a diatomic iodine solution, said composition comprising chloramine-T having a relative vapor pressure less than 0.20 and containing at least 0.5 molecule of water of hydration, and a water-soluble alkali metal iodide.

3. A composition according to claim 1 and wherein said iodide is potassium iodide.

4. The method of making a solid composition adapted to be dissolved in water to form a diatomic iodine solution which comprises heating chloramine-T in a dehydrating environment until its water of hydration is between 0.5 and about 1.5 molecules per molecule of anhydrous chloramide, and mixing the partially dehydrated product with an alkali metal iodide reactive therewith in contact with water to form diatomic iodine.

5. The method of making a solid composition adapted to be dissolved in water to form a diatomic iodine solution which comprises chloramine-T to produce a product having a relative vapor pressure less than 0.2 and containing at least 0.5 molecule of water of hydration per mol of anhydrous material, and mixing the partially dehydrated product with a water-soluble alkali metal iodide to form a composition that generates diatomic iodine in contact with water.

References Cited in the file of this patent

UNITED STATES PATENTS

| 2,250,504 | Salerni | July 29, 1941 |
| 2,380,970 | Kitter | Aug. 7, 1945 |

OTHER REFERENCES

Chem. and Eng. News 23: 5, p. 469 (advt.), Mar. 10, 1945.